(12) United States Patent
Schwab et al.

(10) Patent No.: US 8,133,303 B2
(45) Date of Patent: Mar. 13, 2012

(54) APPARATUS AND METHOD FOR CONTROLLING MERCURY POLLUTION FROM A CEMENT PLANT

(76) Inventors: James J. Schwab, Napa, CA (US); Ronald L. Hawks, Raleigh, NC (US)

( * ) Notice: Subject to any disclaimer, the term of this patent is extended or adjusted under 35 U.S.C. 154(b) by 478 days.

(21) Appl. No.: 12/167,150

(22) Filed: Jul. 2, 2008

(65) Prior Publication Data
US 2010/0000406 A1   Jan. 7, 2010

(51) Int. Cl.
*B01D 53/02* (2006.01)
(52) U.S. Cl. .......... 95/107; 95/47; 95/134; 96/134; 106/761; 106/762
(58) Field of Classification Search .......... 95/47, 107, 95/134; 96/134; 106/761, 762
See application file for complete search history.

(56) References Cited

U.S. PATENT DOCUMENTS

| | | | |
|---|---|---|---|
| 3,976,747 A | 8/1976 | Shale et al. | |
| 4,889,698 A * | 12/1989 | Moller et al. | 423/210 |
| 4,973,459 A * | 11/1990 | Lippert et al. | 423/244.01 |
| 5,219,544 A * | 6/1993 | Kupper et al. | 423/239.1 |
| 5,614,016 A * | 3/1997 | Hundebøl | 106/745 |
| 5,704,780 A * | 1/1998 | Bauer | 432/106 |
| 5,827,352 A | 10/1998 | Altman et al. | |
| 6,506,235 B1 * | 1/2003 | Gertner-Hansen | 95/107 |
| 6,818,043 B1 * | 11/2004 | Chang et al. | 95/37 |
| 6,942,840 B1 * | 9/2005 | Broderick | 423/101 |
| 7,048,779 B1 * | 5/2006 | Weyand et al. | 95/58 |
| 7,279,039 B2 | 10/2007 | Schwab et al. | |
| 7,708,815 B2 * | 5/2010 | Zimmermann | 96/108 |
| 2002/0007731 A1 * | 1/2002 | Steinke et al. | 95/10 |
| 2006/0048646 A1 | 3/2006 | Olson et al. | |
| 2006/0120934 A1 | 6/2006 | Lanier et al. | |
| 2006/0144297 A1 * | 7/2006 | Schwab et al. | 106/624 |
| 2009/0193968 A1 | 8/2009 | Jepsen et al. | |

\* cited by examiner

*Primary Examiner* — Robert J Hill, Jr.
*Assistant Examiner* — Christopher P Jones
(74) *Attorney, Agent, or Firm* — Kilpatrick Townsend & Stockton LLP

(57) ABSTRACT

A method and apparatus for reducing discharges into the atmosphere of mercury pollutants associated with dry process, precalciner cement manufacturing is shown. Raw feed meal used in cement production is heated in a special heating chamber to drive off volatile mercury pollutants, such as elemental mercury and mercury oxides. Preferably, the feed meal is heated to a temperature of at least 175° C. The gases that are driven off flow are then cooled to condense the mercury pollutants causing them to be adsorbed on carbon particles injected into the gas flow. The carbon particles containing the condensed mercury pollutants are then filtered out of gas flow, for example, using a fabric filter. The gas flow may be burned to destroy other volatile pollutants such as hydrocarbons and/or ammonia.

13 Claims, 3 Drawing Sheets

APPARATUS AND METHOD FOR CONTROLLING MERCURY POLLUTION FROM A CEMENT PLANT

FIELD OF THE INVENTION

The present invention relates to methods and apparatus for pollution control, and is particularly directed to controlling emissions of mercury from cement plants.

BACKGROUND OF THE INVENTION

Over the past several decades air pollution control has been a priority concern of society. In the United States primary regulatory authority over industrial source air emissions resides in the U.S. Environmental Protection Agency ("EPA"). Over the years, the EPA has increased the stringency of its air pollution control programs, both by decreasing the limits on acceptable emissions and by continually increasing the number and types of regulated pollutants. Where potentially toxic compounds are released into the atmosphere, sources are required to use the maximum available control technology ("MACT"). Mercury (Hg) is a particularly toxic substance that is dangerous to humans at very low concentrations. Mercury and its compounds are highly persistent in water and the environment and bioaccumulate or concentrate in the tissues of fish. The types of pollutants emitted from an industrial source and the technologies available to control the pollution are highly dependent on the specific industrial process in use. EPA has adopted MACT standards for the control of mercury emissions into the atmosphere associated with the manufacturing of cement.

The inventors' prior U.S. Pat. No. 7,279,039, the disclosure of which is incorporated by reference, describes an apparatus and method for reducing emissions of various types of air pollutants from cement plants. However, the approaches disclosed in their prior patent do not address the specific problems associated with mercury pollution from cement plants. In cement manufacturing mercury may be found both in the fuels and raw materials used in the process. During intense heating in the preheater tower and/or kiln which is necessary to form cement clinker, mercury and most commonly formed mercury compounds (collectively "mercury pollutants") are vaporized and may be emitted with combustion gases. For example, elemental mercury has a substantial vapor pressure even at 95°-105° C. A fraction of the mercury entrained in the exhaust gas flow condenses on the kiln dust or raw meal under certain conditions and may be discharged with waste cement kiln dust (CKD). However, the major fraction of the mercury is emitted unimpeded from existing air pollution equipment (i.e., fabric filters) as a gas. The emitted mercury pollutants may include oxide or salts (ionic) and/or molecular vapor (elemental) depending on kiln equipment operation and design.

The current methods available for control of mercury emissions in cement production include: 1) reduction of mercury inputs, 2) capture of mercury at the point of emissions using carbon adsorption, and 3) capture in wet scrubbers. Each of these control methods has a significant economic impact on the cost of cement production through substantially higher operating costs or substantial capital cost for new equipment. Current technology used for mercury emission control include the adsorption of the oxide on activated carbon injected after the removal of kiln feed dust from the main plant gas stream. This approach involves the use of a secondary capture system after the primary particulate control device. Carbon injection rates are significant (i.e., 1 to 5 lb/100,000 acfm) and the capital cost of the secondary capture device is high (approximately $25 million). Moreover, for effective capture, the mercury must be present in the oxide form and have a predictable emission rate. In addition, the carbon to adsorb the mercury must, itself, then be treated as a waste stream requiring regeneration off-site or disposal in a suitable landfill at high additional cost.

Mercury may also be removed from the gas stream concurrent with $SO_2$ in the wet scrubbers used in some systems. In this case, the gypsum product generated contains the mercury oxide and cannot be used as synthetic gypsum in the finish mills. Further, this approach results in the presence of mercury in the scrubber liquor discharge, requiring special wastewater treatment to remove the mercury prior to discharge.

The foregoing problems are applicable to cement manufacturing facilities including those which use a precalciner prior to feeding the meal into the pyroprocessing kiln. A typical modern, prior-art cement manufacturing facility is shown in FIG. 1. While other dry and wet cement manufacturing processes are known, the dry precalciner process depicted in FIG. 1 is now the most common and efficient.

The primary feed material, comprising a calcium-containing mineral used in manufacturing the cement, is obtained from a quarry, usually located nearby the cement plant. Typically the primary feed material is limestone, with smaller quantities of sand, clay, shale, and/or bauxite also being used. The feed materials provide the calcium, silica, aluminum and iron necessary to produce cement. However, these feed materials contain naturally occurring mercury, typically in range of 2 to 40 parts per billion (ppb), which cannot be avoided by selective mining. Likewise, the fuel (coal) and added fly ash from the coal also contain appreciable amounts of mercury. The fuel supply does not generally support changes to achieve low mercury content. The most effective raw material change is substitution of bauxite for fly ash or other alumina sources. However, this has a significant economic impact due to the low cost of fly ash and high cost of bauxite (imported) and the necessity for additional equipment changes. Moreover, the mercury content of fly ash has increased as utility boilers have changed operations to reduce mercury gas emissions by concentrating the mercury in the captured fly ash.

The quarried material is reduced in size by a crusher (not shown), and the crushed raw material is then transported to the cement plant, for example by motor or rail vehicle or by conveyor (also not shown). The proper proportions of the raw materials are then mixed and further reduced in size in a raw mill 10 to form a meal or feed material. For convenience the term "feed meal" is generally used herein to refer to the solid materials from the time they are processed in the raw mill to the time they enter the kiln. Thus, as used herein, feed meal includes the meal that has undergone precalcining.

The raw feed meal from raw mill 10 is then preheated in a preheating tower, comprising a series of vertically stacked cyclone chambers using exhaust gas from the kiln. While two such cyclone chambers (21, 22) are shown in FIG. 1, more (typically 3 or 4) may be used. Collectively these are referred to herein as the preheating tower and includes a precalciner 30. As depicted in FIG. 1, feed meal from raw mill 10 enters at the top of the preheating tower 21 and is preheated as it descends under the force of gravity.

The heated feed meal is introduced into a precalciner 30 at the bottom of the preheating tower, where the calcium carbonate ($CaCO_3$) in the limestone (or other feed material) is converted into calcium oxide (CaO), releasing a large amount of carbon dioxide ($CO_2$) in the process, thereby increasing the volume of the gas flow. This conversion is accomplished by heating the feed meal to high temperature—between about 900° C. and 1,000° C. The required temperature is higher than the temperature of the kiln exhaust gases, and so typically additional heat is generated in the precalciner by combustion of auxiliary fuel.

After precalcination the feed meal is introduced into a large rotary kiln 40 where it is heated to a temperature of about 1,500° C.) to form "clinker," consisting primarily of calcium silicates. Rotary kiln 40, which may be as long as 700 feet (213 meters), is substantially horizontal, with a slight tilt sufficient for gravity-assisted transport of the materials undergoing pyroprocessing along its length. Various fuels may be used to support combustion within the kiln in order to achieve the high processing temperature that is required. The hot clinker is then discharged from the kiln into a cooling chamber 50. After being cooled, the clinker is discharged from cooling chamber 50 and ground into fine particles. Normally, a small amount of gypsum is added during this final stage of the process.

The air used for combustion in kiln 40 first flows through cooling chamber 50, where it gains heat as it cools the clinker. The hot exhaust gases from kiln 40 flow through the precalciner 30 and then to the preheating tower 21 as described. After combustion in the kiln very little oxygen remains in the exhaust gas flow, and so additional air is introduced into precalciner 30 to support combustion, again increasing the volume of gas that is ultimately discharged from the plant. After passing through preheating tower 21, the exhaust gases are routed through raw mill 10 used to grind the raw feed materials, before being discharged into the atmosphere via stack 60. Contact with the hot exhaust gases heats and dries the feed meal in the grinder. Because of the high particulate load, a baghouse or electrostatic precipitator 70 is used to remove particles from the gas flow, which are typical recycled back into and blended with the feed meal.

In FIG. 1 the movement of the solids (i.e., the feed materials, clinker, etc.) between the various processing operations is shown by solid lines, while the flow of gases is shown with dashed lines. It can thus be seen that the gas flow through the process is generally counter to the flow of the solids and, from the time the gases leave the kiln to the time they are exhausted into the atmosphere, they exchange heat with the feed meal, i.e., the gases are cooled as the feed meal is dried and heated. Thus, for example, the feed meal is progressively heated as it travels down the preheating tower from one preheating cyclone to the next, while the flue gases become successively cooler as they travel up the preheater tower.

Recent published test data on mercury emissions from preheater/precalciner cement kilns employing in-line rock grinding to produce kiln feed, show that at preheater exit conditions (i.e., temperature and oxygen) elemental mercury vapor is converted to an oxide form (at <500° C., optimum at 300°-350° C.). The various oxides of mercury (referred to herein as mercury oxides) condense into particles when the gas temperature is further reduced. Further gas temperature reduction occurs when the exhaust gas flow from the preheater tower is used to heat the feed meal in the grinder. Most of the mercury pollutants are condensed by cooling in the grinder and are recaptured in the feed meal. They are then returned with the feed meal to the preheater tower. In the preheater, the captured mercury oxides in the feed are again vaporized and re-emitted into the gas flow, resulting in a recirculating pattern that increases its concentration over time. However, when the in-line grinding mill is down, the enriched recirculating load of mercury is no longer subject to recondensation in the mill and, instead, is emitted from the process. Under these conditions, the grinding mill is bypassed and the temperature of the exhaust gas is sufficiently high (190°-230° C.) that mercury pollutants in the exhaust gas flow do not condense in the fabric filter dust layer. In contrast, when the mill is on the exhaust flow entering the fabric filter is much cooler (e.g., 95°-110° C.) such that any mercury pollutants that are not condensed and captured in the grinder will be condensed and captured in the fabric filter dust layer. Limited test data indicate that mercury emissions during mill down periods may be 3 to 15 times higher than during mill-in periods. The exact concentration of emitted mercury is a function of the mercury content of the raw materials, the ratio of mill-in to mill-down operating time, and efficiency of conversion of vapor to oxide species in the exhaust of the preheater tower. The predominate mercury pollutants emitted during the mill-in period is elemental mercury vapor and during the mill down is mercury oxide.

FIG. 2 shows an improvement to the prior art arrangement shown in FIG. 1 as set forth in the inventors' U.S. Pat. No. 7,279,039, wherein the feed meal is heated at the outset of the process to drive off volatile compounds which are then combusted. Unlike the volatile organic compounds and other pollutants described in the inventors' prior patent, which are substantially destroyed (i.e., broken down into harmless compounds) by the combustion process, mercury is not broken down and, instead, is simply reintroduced into the gas stream. Once in the gas flow it behaves in a manner similar to that described in connection with FIG. 1; i.e., the mercury oxides are formed in the preheater tower and are condensed when the gas flow is used to heat the feed meal in the grinder. Ultimately, the mercury pollutants are either emitted into the atmosphere with the plant exhaust, or recaptured in the feed meal and recirculated.

SUMMARY OF THE INVENTION

Accordingly, there is need for an improved apparatus and method of reducing mercury emissions into the atmosphere from cement manufacturing.

In one aspect, the present invention is directed to a method of removing mercury containing pollutants from a cement plant, comprising heating the raw feed meal used in the cement plant to a first temperature sufficient to volatilize mercury pollutants, removing the volatilized mercury pollutants and containing said volatilized pollutants in a first gas flow that is separate from the main cement plant gas flow, reducing the temperature of the gas flow to a second temperature to condense the mercury pollutants, adsorbing the condensed mercury pollutants on carbon particles injected into the gas flow, and filtering the gas flow to remove the mercury pollutant contaminated carbon particles. Preferably, the first temperature is between about 175° and about 230° C., and the second temperature is more than about 100° C. The step of heating the feed meal may be performed in a non-contact heat exchanger which uses kiln exhaust gases as the heat source. Likewise, the step of reducing the temperature of the gas flow may be performed in a non-contact heat exchanger using air as the cooling fluid. The step of filtering the gas flow may use a fabric filter. The gas flow may be directed to a calciner used in the cement plant after filtering. The carbon particles may be treated with bromine or a sulfide compound to enhance the capture of mercury pollutants. In one embodiment, the gas flow is combusted after it has been heated to said first temperature but before the temperature has been reduced to said second temperature to destroy or otherwise render harmless other pollutants in the gas flow, such as organic compounds or ammonia; and the gas flow can be passed through a selective catalytic converter after it has been combusted. Lime particles may also be introduced into the gas flow after combusting the gas flow, and may be mixed with the carbon particles for such purpose.

In another aspect, the present invention comprises a method of removing mercury containing pollutants from a cement plant having a main gas flow, including the steps of heating feed meal to a first temperature sufficient to volatilize pollutants in said feed meal, including mercury pollutants and non-mercury pollutants, and containing said volatilized pollutants in a first gas flow that is separate from the main cement plant gas flow, combusting the first gas flow to render at least some of said non-mercury pollutants harmless, reducing the temperature of the gas flow to a second temperature to condense the mercury pollutants and adsorbing the condensed mercury pollutants on carbon particles injected into the first gas flow, and filtering the gas flow to remove the mercury pollutant contaminated carbon particles. The first gas flow may be passed through a selective catalytic converter after it has been combusted.

In another aspect the present invention is directed to an apparatus for removing mercury pollutants from a cement plant, including a grinder for producing feed meal for cement production, a first heat exchanger for heating feed meal produced in the grinder to a first temperature sufficient to volatilize mercury pollutants in the feed meal, a conduit for removing the heated exhaust gas flow from the first heat exchanger, the gas flow containing volatilized mercury pollutants, a cooler for reducing the temperature of said gas flow to a second temperature sufficient to condense the mercury pollutants on carbon particles introduced into the gas flow from a carbon particle source, and a filter to remove the mercury pollutant laden carbon particles from the gas flow.

In yet another aspect, the present invention is directed to an apparatus for removing mercury pollutants from a cement plant, including a heater for heating feed meal used in cement production to drive off volatile pollutants in said feed meal into a gas flow that is isolated from the main gas flow through the cement plant, a chamber for combusting the gas flow to render at least some of the pollutants in said gas flow harmless, means for cooling the gas flow, an injector for introducing carbon particles into said gas flow to adsorb mercury pollutants in the cooled gas flow, and a filter for removing the mercury pollutant containing carbon particles from said gas flow. The apparatus of claim 16 further comprising a selective catalytic reactor for treating said gas flow after it has been combusted. The means for cooling may be a heat exchanger or an evaporative cooler or a source of relatively cool dilution air connected to the gas flow.

DETAILED DESCRIPTION OF EXEMPLARY EMBODIMENTS

Figure 1:
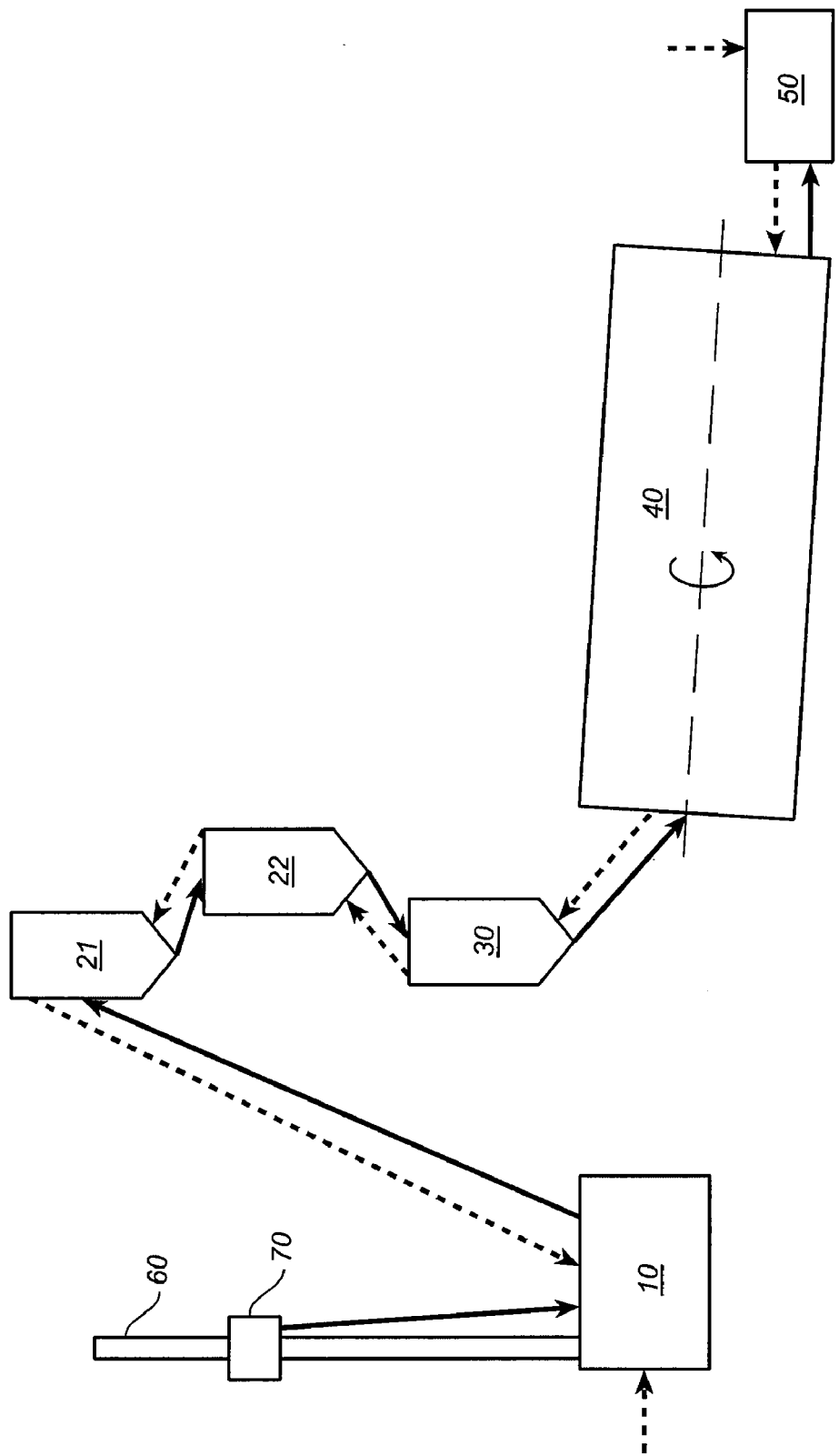
FIG. 1 is a schematic representation of a typical prior art dry-process, precalciner cement plant.

In accordance with prior art, dry-process cement manufacturing, as exemplified schematically in the previously described FIG. 1, exhaust gases from kiln 40 are used to preheat and dry the feed meal before pyroprocessing. As the feed meal is heated impurities and other substances are volatilized forming various types of gaseous and aerosol pollutants which become entrained in the exhaust gas flow, and which may be released into the atmosphere. Because in the prior art layout of a cement plant, as depicted in FIG. 1, the exhaust gas flow is counter to the process flow, the volatilized compounds are not further heated or broken down prior to release. The nature and extent of the pollutants released from a facility, such as that which is depicted in FIG. 1, depends not only on the nature and impurity content of the raw materials that go into the feed meal, but on the temperatures used in the preheating towers. Unfortunately, efforts to minimize the creation of certain types of pollutants generated in the preheating tower by attempting to carefully control the temperatures in the tower have proven to be largely ineffective.

Figure 2:
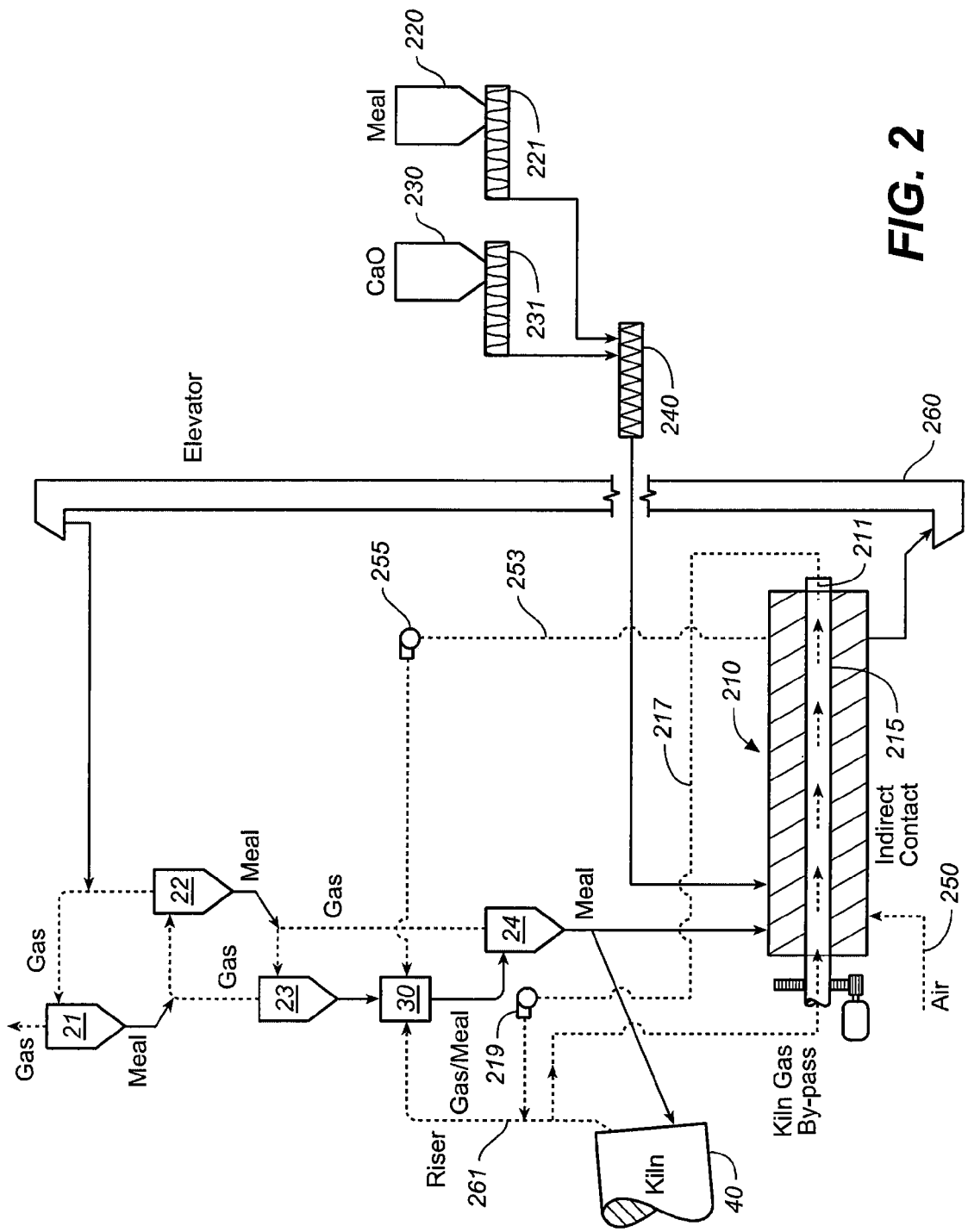
FIG. 2 is a partially schematic illustration of an improved dry-process, precalciner cement plant in accordance with the inventor's U.S. Pat. No. 7,279,039.

FIG. 2 is a partially schematic illustration of a cement plant having improved pollution control apparatus in accordance with the inventors' U.S. Pat. No. 7,279,039. Again, the plant depicted is a dry-process, precalciner type facility, similar in many of its essential features to the one depicted in FIG. 1, and the same reference numbers are used for the same elements. In FIG. 2 the feed meal is heated in a separate chamber to drive off any volatile materials, using hot exhaust gas from the kiln. The gases that are driven off from the feed meal then flow to a combustion chamber where they are subjected to various types of combustion-induced reactions, rendering most of the volatile materials relatively harmless. Thus, for example, harmful organic compounds may be oxidized to form water and carbon dioxide. Preferably and conveniently, the combustion chamber is the precalciner. However, as described above, the process flow of FIG. 2 does not adequately address emission of mercury pollutants.

In FIG. 2, raw feed meal from a raw mill (not shown) is transported to bin 220 and is introduced into a heater 210. Prior to being fed into the heater 210, the feed meal may be mixed with other materials, such as lime, to adjust the properties of the cement and to further reduce the release of pollutants as described below.

Figure 3:
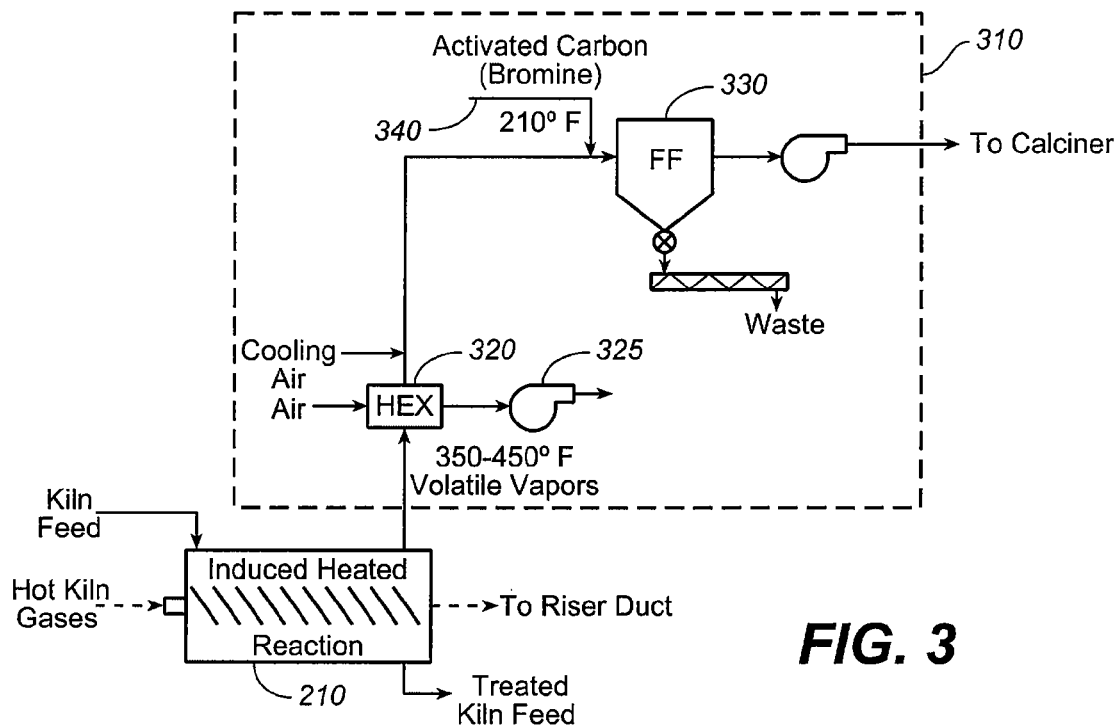
FIG. 3 is a partially schematic illustration of an embodiment of a feed meal treatment apparatus in accordance with one aspect of the present invention.

In FIG. 2, two screw transport mechanisms 221 and 231 are used to transport feed meal and lime (from bin 230), respectively, to mixer 240. The mixture is then transported to heater 210. A portion of the hot exhaust gases from kiln 40 is directed to heater 210. The gases flow through central duct 211 and are used to heat the feed meal mixture in heater 210. As depicted, heating is primarily accomplished indirectly, with the wall 215 of duct 211 serving as a heat exchange surface. Preferably, heater 210 comprises a screw or other transport mechanism to move the feed meal from one end of the heater to the other, as shown in FIG. 3. The screw also serves to further mix the feed meal so that it is uniformly heated.

Preferably, the feed meal enters heater 210 at a temperature which is relatively cool, i.e., lower than the temperature at which harmful compounds are volatilized, and is heated to a temperature sufficiently high to drive off the harmful volatile compounds of concern. Preferably, the temperature of the feed meal is raised to at least about 175° C. or more in heater 210.

After transiting heater 210, the heated feed meal exits and it then transported to the preheating tower 21 where it is further heated, as previously described. The feed meal then descends through heating towers 21 to precalciner 30 where it is precalcined, as previously described. The volatilized gases driven from the feed meal in heater 210 flow to precalciner 30, which acts as a combustion chamber. Air enters heater 210 by input duct 250. After circulating in the heater in contact with the feed meal, the air leaves via duct 253 which connects heater 210 to precalciner 30. The air, which carries the volatilized compounds driven off from the feed meal with it, is propelled by fan 255. If needed additional air can be added to the flow into the precalciner, depending on the needs of the precalciner combustion process. It can be appreciated that using a heater, according to the present invention, to volatilize and remove the hydrocarbon and other species of concern in feed meal prevents these substances from being released in the preheating tower.

A portion of the hot exhaust gases from kiln 40 also flows directly to precalciner 30 via duct 261. These gases have been substantially depleted of oxygen because of combustion with the kiln, such that an additional source of air is needed to provide oxygen to support combustion in precalciner 30. The air leaving heater 210 serves this function. Combustion of the volatilized gases in precalciner 30 causes various combustion reactions, depending on the substances, which substantially renders most harmful pollutants relatively harmless.

As depicted in FIG. 2, after traveling through heater 210, the hot exhaust gases which are used to indirectly heat the feed meal are carried away in duct 217 propelled by fan 219. These gases are then recombined with the remaining kiln exhaust gas in duct 261 and flow to precalciner 30 and, thereafter, through the rest of preheating tower 23, 22, 21. As in the prior art, after flowing through the heating tower, the exhaust flue gases from the kiln may be used to dry and heat the feed meal in the raw mill, so long as the temperature of the feed meal is not raised above the point at which harmful compounds are volatilized. As described above, however, this causes mercury pollutants in the gas flow to condense and re-enter the feed meal.

Also shown in FIG. 2 is an elevator 260 which is used to transport the feed meal from heater 210 to the preheating tower 21. In terms of physical layout, particularly for an apparatus of the present invention which is retrofitted into an existing cement plant, it is convenient to install heater 210 at a level which is below the top of the tower, requiring a transport mechanism to carry the heated feed meal to the top of tower 21. Thereafter, the feed meal flows through the plant in a conventional manner except, as noted, a relatively small portion may be diverted from the final cyclone 24 back to heater 210 where it helps heat the raw feed meal and promotes base-base exchange reactions.

As can be appreciated from the foregoing, cement plants are advantageously designed for maximum efficiency to make optimal use of thermal energy. Gases are routed through the plant so as to use and recapture as much of the heat as possible such that the addition system of FIG. 2 does not appreciably affect the overall heat balance of the cement plant. Substantially all of the heat extracted from the kiln exhaust gases in heater 210 goes into either the meal or the air which flows from heater 210 to precalciner 30. In either case, the heat is retained in the process and is advantageously used. Thus, the preheated meal enters tower 21 at a temperature which is higher than if the meal were to be sent to the tower directly from the raw mill, and the air used for combustion in the precalciner is, likewise, hotter than if it were simply drawn into the combustion chamber externally. Accordingly, those skilled in the art will appreciate the desirability of optimizing the physical layout to minimize heat losses as the materials travel between the various processing stations in the system.

As noted, while the system of FIG. 2 efficiently removes combustible volatile compounds from the exhaust gases, it is not optimized to remove mercury pollutants. FIG. 3 illustrates a modification of the apparatus of FIG. 2 for capturing mercury, in accordance with an embodiment of the present invention. FIG. 3 depicts an apparatus 310 for capturing mercury and removing it from the gas stream. Apparatus 310 comprises a heat exchanger 320 which receives the heated gas flow from heater 210 comprising volatile materials released from the feed meal processed by the heater. Specifically, the volatile materials driven off by heating the feed meal include any mercury and mercury compounds contained in the feed meal, as well as various organic compounds, as previously described. The gases leaving heater 210 are, preferably heated to between about 175°-230° C. to ensure that the desired compounds are driven off, i.e., vaporized. Heat exchanger 320 is then used to cool the gases to about 100° C. using cooling air drive by fan 325. The preferred temperature of the gas flow leaving heat exchanger 320 is selected to be slightly below the point at which mercury pollutants in the gas flow condense, but high enough to avoid condensation of the volatile organic materials in the gas stream. While a second heat exchanger is shown, any other suitable cooling means may be used, for example, an evaporative cooler or cool air dilution.

The cooled gases leaving heat exchanger 320 then flow to a fabric filter 330, propelled by fan 335. Prior to entering fabric filter 330, fine particles of powdered carbon (preferably activated) are blown or aspirated into the gas stream at 340. Preferably, the carbon is treated with bromine or a sulfide compound; however, other substances that react with the mercury pollutants may also be used. The mercury pollutants are adsorbed by and react with the carbon, and the mercury containing carbon particles are captured by fabric filter 330. While mercury will be removed by the carbon before the carbon is filtered, some of the mercury may be removed by carbon particles after they have been filtered and form a layer or "cake" on the filter. The mercury-containing particles captured by fabric filter are then removed for disposal as hazardous waste. The gas stream containing the uncondensed volatile organic compounds then flows to a combustion chamber, preferably, precalciner 30 (FIG. 2) as previously described, where the remaining volatiles are broken down and are rendered non-hazardous.

Figure 4:
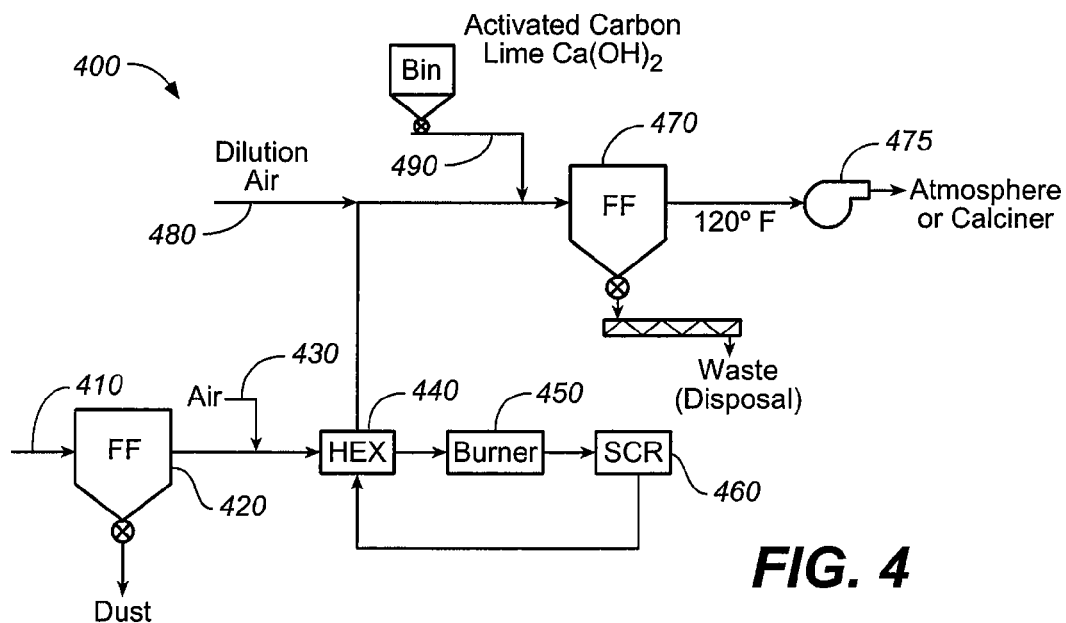
FIG. 4 is a partially schematic illustration of another embodiment of a feed meal treatment apparatus in accordance with another embodiment of the present invention.

An alternate embodiment for implementing the present invention is depicted in FIG. 4, which shows an apparatus 400 for removing mercury from a cement plant. Heated gas from the feed meal leaves heater 210 (FIG. 2) and enters apparatus 400 at input 410. Again, the gas leaving heater 210 is, preferably heated to between about 175°-230° C. to ensure that the desired compounds are driven off, i.e., vaporized. Any dust in the gases may, optionally, be removed by input fabric filter 420. Thereafter, air is added to the gas at 430 to increase the amount of oxygen available for combustion. The added air, however, causes cooling of the mixture.

The cooled mixture then flows to heat exchanger 440 where its temperature is increased, and on to combustion chamber 450 where volatile organics are destroyed (i.e., converted to harmless compounds) as previously described in connection with FIG. 2. Any free molecular mercury in the gas stream may be converted to an oxide in combustion chamber 450. The gas from combustion chamber 450 then flows to a selective catalytic reactor (SCR) 460 where any oxides of nitrogen are converted to nitrogen ($N_2$) and water. As depicted, after passing through SCR 460, the exhaust from burner 450 flows back to the other side of heat exchanger 440 where it is used to heat the cooled air/gas mixture entering the heat exchanger.

After leaving heat exchanger 440, the gases flow towards a second fabric filter 470 drawn by fan 475. However, prior to entering second fabric filter 470 additional air may be added to the flow at point 480, which may be at any location along the flow path between heat exchanger 440 and second fabric filter 470. Powdered carbon (preferably activated) is added to the flow (blown in) at point 490 just before the fabric filter. In order to react with $SO_3$ created in combustion chamber 450, the activated carbon preferably has lime ($Ca(OH)_2$) added. Again, the activated carbon adsorbs the mercury pollutants in the gas flow, either before or after the carbon is caught by the filter. The mercury contaminated particles are then removed by the fabric filter. After passing through second fabric filter 470, the gases are substantially free of pollution and can be discharged into the atmosphere. Alternatively, the gases may be directed to precalciner 30 (FIG. 2) for further combustion.

In both embodiments described, mercury and other compounds are driven out of the feed meal in heater 210. It is noted that this gas flow is independent of, and relatively much smaller (in volume) than the main gas flow through the kiln. Thus, the volume of gas that must be processed and filtered to remove mercury is much smaller than is involved in treating the kiln gas flow. This provides significantly greater efficiency and results in a much smaller volume of mercury contaminated solid waste that needs handling. The present invention, moreover, can be easily adapted and retrofitted to existing cement plants without any substantial changes to the existing structures or process flows, thereby providing a cost-effective approach to addressing increasingly stringent regulatory requirements for mercury removal.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of removing mercury containing pollutants from a cement plant, comprising:
    indirectly heating raw feed meal used in cement production to a first temperature sufficient to volatilize mercury pollutants,
    removing the volatilized mercury pollutants and containing said volatilized pollutants in a first gas flow that is separate from a main cement plant gas flow,
    reducing the temperature of the first gas flow to a second temperature to condense the mercury pollutants in a non-contact heat exchanger using air as a cooling fluid;
    adsorbing the condensed mercury pollutants on carbon particles injected into the first gas flow,
    filtering the first gas flow to remove the carbon particles from the first gas flow, thus forming a cleaned first gas flow; and
    returning the cleaned first gas flow to the main cement plant gas flow.

2. The method of claim 1 wherein said first temperature is between about 175° and about 230° C.

3. The method of claim 1 wherein said second temperature is more than about 100° C.

4. The method of claim 1 wherein the step of heating the feed meal is performed in a non-contact heat exchanger which uses kiln exhaust gases as a heat source.

5. The method of claim 1 wherein the step of filtering the first gas flow comprises using a fabric filter.

6. The method of claim 1, wherein returning the cleaned first gas flow to the main cement plant gas flow comprises causing the cleaned first gas flow to flow to a calciner used in the cement plant after filtering.

7. The method of claim 1 wherein said carbon particles have been treated with bromine or a sulfide compound.

8. The method of claim 1 further comprising the step of combusting the first gas flow after it has been heated to said first temperature and before the temperature has been reduced to said second temperature.

9. The method of claim 8 further comprising passing said first gas flow through a selective catalytic converter after it has been combusted.

10. The method of claim 8 further comprising injecting lime particles into the first gas flow after said step of combusting the gas flow.

11. The method of claim 10 wherein said lime is mixed with said carbon particles prior to injection.

12. A method of removing mercury containing pollutants from a cement plant having a main gas flow, comprising the steps of:
    indirectly heating feed meal to a first temperature sufficient to volatilize pollutants in said feed meal, including mercury pollutants and non-mercury pollutants, and containing said volatilized pollutants in a first gas flow that is separate from the main cement plant gas flow,
    combusting the first gas flow to render at least some of said non-mercury pollutants harmless,
    reducing the temperature of the first gas flow to a second temperature to condense the mercury pollutants in a non-contact heat exchanger using air as a cooling fluid;
    adsorbing the condensed mercury pollutants on carbon particles injected into the first gas flow,
    filtering the first gas flow to remove the mercury pollutant contaminated carbon particles, thus forming a cleaned first gas flow; and
    returning the cleaned first gas flow to the main cement plant gas flow.

13. The method of claim 12 further comprising passing said first gas flow through a selective catalytic converter after it has been combusted.

* * * * *